(12) United States Patent
Egorov et al.

(10) Patent No.: US 10,574,440 B2
(45) Date of Patent: *Feb. 25, 2020

(54) HIGH-PERFORMANCE ACCESS MANAGEMENT AND DATA PROTECTION FOR DISTRIBUTED MESSAGING APPLICATIONS

(71) Applicant: ZeroDB, Inc., San Francisco, CA (US)

(72) Inventors: Mikhail Egorov, San Francisco, CA (US); MacLane Scott Wilkison, Mountain View, CA (US); David Nuñez, San Francisco, CA (US); Isaac Agudo, Malaga (ES)

(73) Assignee: ZeroDB, Inc., San Francisco, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/974,161

(22) Filed: May 8, 2018

(65) Prior Publication Data

US 2018/0254892 A1    Sep. 6, 2018

Related U.S. Application Data

(63) Continuation-in-part of application No. 15/588,614, filed on May 6, 2017.

(Continued)

(51) Int. Cl.
*G06F 21/00* (2013.01)
*H04L 29/06* (2006.01)
(Continued)

(52) U.S. Cl.
CPC .......... *H04L 9/0819* (2013.01); *H04L 9/0662* (2013.01); *H04L 9/088* (2013.01);
(Continued)

(58) Field of Classification Search
CPC ....... H04L 9/0819; H04L 9/0891; H04L 9/14; H04L 9/30; H04L 9/0662; H04L 9/0833; H04L 9/088; H04L 9/0894
See application file for complete search history.

(56) References Cited

U.S. PATENT DOCUMENTS

2009/0150675 A1   6/2009  Cook
2011/0035503 A1*  2/2011  Zaid ................... H04L 63/0407
                                              709/228

(Continued)

FOREIGN PATENT DOCUMENTS

EP       2953321 A1 * 12/2015  ............ H04L 29/06
WO    2015055762 A1    4/2015

OTHER PUBLICATIONS

Emanuel Onica, Pascal Felber, Hugues Mercier, Etienne Rivière; "Efficient Key Updates through Subscription Re-encryption for Privacy-Preserving Publish/Subscribe"; Nov. 2015; Middleware '15: Proceedings of the 16th Annual Middleware Conference Publisher: ACM; pp. 1-12 (Year: 2015).*

(Continued)

*Primary Examiner* — Shewaye Gelagay
*Assistant Examiner* — Courtney D Fields
(74) *Attorney, Agent, or Firm* — Pillsbury Winthrop Shaw Pittman, LLP

(57) ABSTRACT

Provided is a computer system and method that enables delegated access to encrypted information for distributed messaging and queuing frameworks, or in general, to publish/subscribe architectures. In said frameworks and architectures, data is published by data producers and organized in channels or queues, which consumer applications can subscribe to, and that are managed by one or multiple broker entities.

20 Claims, 6 Drawing Sheets

Related U.S. Application Data

(60) Provisional application No. 62/502,938, filed on May 8, 2017, provisional application No. 62/332,840, filed on May 6, 2016.

(51) Int. Cl.
*H04L 9/08* (2006.01)
*H04L 9/30* (2006.01)
*H04L 9/14* (2006.01)
*H04L 9/06* (2006.01)
*H04L 12/16* (2006.01)
*H04L 12/58* (2006.01)

(52) U.S. Cl.
CPC .......... *H04L 9/0833* (2013.01); *H04L 9/0891* (2013.01); *H04L 9/0894* (2013.01); *H04L 9/14* (2013.01); *H04L 9/30* (2013.01)

(56) References Cited

U.S. PATENT DOCUMENTS

| | | | |
|---|---|---|---|
| 2011/0131222 | A1 | 6/2011 | Dicrescenzo |
| 2014/0140514 | A1 | 5/2014 | Gentry |
| 2014/0164776 | A1* | 6/2014 | Hook ................. H04L 9/14 713/171 |
| 2015/0067330 | A1 | 3/2015 | Khan et al. |
| 2015/0149427 | A1 | 5/2015 | Kerschbaum et al. |
| 2015/0271153 | A1 | 9/2015 | Rohloff et al. |
| 2016/0055347 | A1 | 2/2016 | Park et al. |
| 2016/0182242 | A1 | 6/2016 | Rathod |
| 2016/0234012 | A1 | 8/2016 | Kawai et al. |
| 2017/0054716 | A1 | 2/2017 | Egorov et al. |

OTHER PUBLICATIONS

ElGamal, T., "A Public Key Cryptosystem and a Signature Scheme Based on Discrete Logarithms" in Workshop on the Theory and Application of Cryptographic Techniques, Springer Berlin Heidelberg, https://people.csail.mit.edu/alinush/6.857-spring-2015/papers/elgamal.pdf, Aug. 1984, pp. 10 to 18.

Blaze et al., "Divertible Protocols and Atomic Proxy Cryptography" in International Conference on the Theory and Applications of Cryptographic Techniques, Springer Berlin Heidelberg, https://link.springer.com/content/pdf/10.1007%2FBFb0054122.pdf, May 1998, pp. 127-144.

Ateniese et al., "Improved Proxy Re-Encryption Schemes with Applications to Secure Distributed Storage" in ACM Transactions on Information and System Security (TISSEC), 9(1), 1-30, https://spqr.eecs.umich.edu/papers/ateniese-proxy-reenc-tissec.pdf, 2006, pp. 1 to 30.

Ateniese et al., "Improved Proxy Re-Encryption Schemes with Applications to Secure Distributed Storage" in Cryptology ePrint Archive, at 2005/028, https://eprint.iacr.org/2005/028.pdf, pp. 1 to 25.

Blaze et al., "Divertible Protocols and Atomic Proxy Cryptography", in Proceedings of Eurocrypt '98, vol. 1403, https://pdfs.semanticscholar.org/ff26/95513e7e0f49a0a484818c19b6346e076172.pdf, 1998, pp. 127-144.

Nuñez et al., "Delegated Access for Hadoop Clusters in the Cloud" in IEEE International Conference on Cloud Computing Technology and Science, 2014, pp. 374-379.

The Internet Archive capture of Apr. 20, 2017 of https://web.archive.org/web/20170420120155/https://kafka.apache.org/documentation/, pp. 1 to 108.

International Search Report and Written Opinion for Related PCT Application PCT/US2018/031615 dated Sep. 21, 2018, pp. 1 to 14.

International Preliminary Report on Patentability in International Application No. PCT/US2018/031615 dated Nov. 12, 2019.

* cited by examiner

HIGH-PERFORMANCE ACCESS MANAGEMENT AND DATA PROTECTION FOR DISTRIBUTED MESSAGING APPLICATIONS

CROSS-REFERENCE TO RELATED APPLICATIONS

This patent is claims the benefit of U.S. Provisional Patent Application 62/502,938, titled HIGH-PERFORMANCE ACCESS MANAGEMENT AND DATA PROTECTION FOR DISTRIBUTED MESSAGING FRAMEWORKS AND LIBRARIES, filed 8 May 2017, and is a continuation-in-part of U.S. patent application Ser. No. 15/588,614, titled ENCRYPTION FOR DISTRIBUTED STORAGE AND PROCESSING, filed 6 May 2017, which is a non-provisional of, and thus claims the benefit of, U.S. Provisional Patent Application 62/332,840, titled ENCRYPTION FOR DISTRIBUTED STORAGE AND PROCESSING, filed 6 May 2016. The entire content of each of these earlier patent applications is hereby incorporated by reference in its entirety.

BACKGROUND

1. Field

The present disclosure relates generally to distributed computing and, more specifically, to high-performance access management and data protection for distributed messaging applications.

2. Description of the Related Art

Some computer applications process data through an approach referred to as stream processing. Often, data flows through a collection of nodes (e.g., computers, virtual machines, containers, network hosts, processes, or other computational entities) in the form of messages, in some cases, asynchronously. In some cases, these messages may be routed according to a publisher-subscriber graph among those nodes. The messages may contain data that is processed at the different nodes or instructions from one node to another node to invoke some functionality. In some cases, this type of approach is also referred to as dataflow programming, event stream processing, and reactive programming.

SUMMARY

The following is a non-exhaustive listing of some aspects of the present techniques. These and other aspects are described in the following disclosure.

Some aspects include a process that enables delegated access to encrypted information for distributed messaging and queuing frameworks, or in general, to publish/subscribe architectures. In said frameworks and other architectures, data is published by data producers and organized in channels or queues, which consumer applications can subscribe to, and that are managed by one or multiple broker entities.

Some aspects include a process, including: receiving, with a publish-subscribe application executed by one or more processors, from a first data producer, a first message and a first request to publish the first message to a first channel specified by the first request, wherein: at least part of the first message is encrypted by the first data producer, the first data producer is one of a plurality of data producers for which the publish-subscribe application publishes messages, the first channel is one of a plurality of channels on which the publish-subscribe application publishes messages on behalf of the plurality of data producers, at least part of the at least part of the first message is decryptable with a first private encryption key of a first public-private encryption key pair associated with the first channel, each of the plurality of channels is associated with at least one different respective public-private encryption key pair among a plurality of public-private encryption key pairs, private encryption keys of the public-private encryption key pairs are maintained in a first security domain, the plurality of data producers are external to the first security domain, and public encryption keys of the public-private encryption key pairs are accessible to the plurality of data producers; determining, with the publish-subscribe application, that a first subscriber is to be granted access to at least part of messages published to the first channel, wherein: the first subscriber is one of a plurality of subscribers to which the publish-subscribe application publishes messages on the plurality of channels from the plurality of data producers; obtaining, with the publish-subscribe application, in the first security domain, a second public encryption key of the first subscriber, wherein: the second public encryption key is a member of a second public-private encryption key pair, each of the subscribers is associated with at least one public encryption key from among a plurality of public-private encryption key pairs, and respective subscribers have access to associated private encryption keys among the plurality of public-private encryption key pairs; generating a first re-encryption key associated with the first channel and the first subscriber, wherein: the first re-encryption key is generated with proxy re-encryption based on the first private encryption key and the second public encryption key, and the first re-encryption key is generated within the first security domain, such that the first private encryption key is not revealed outside of the first security domain by generating the first re-encryption key; in response to determining that the first subscriber is to be granted access to the first channel, providing the first re-encryption key to a portion of the publish-subscribe application outside of the first security domain; transforming at least part of the at least part of the first message that is encrypted with the first re-encryption key to at least partially form a first transformed message, wherein: transforming at least part of the at least part of the first message is performed without decrypting the at least part of the at least part of the first message, and transforming at least part of the at least part of the first message is performed outside of the first security domain; and providing the first transformed message on the first channel to the first subscriber, wherein: the at least part of the at least part of the first message is decryptable based on the second private encryption key of the first subscriber.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
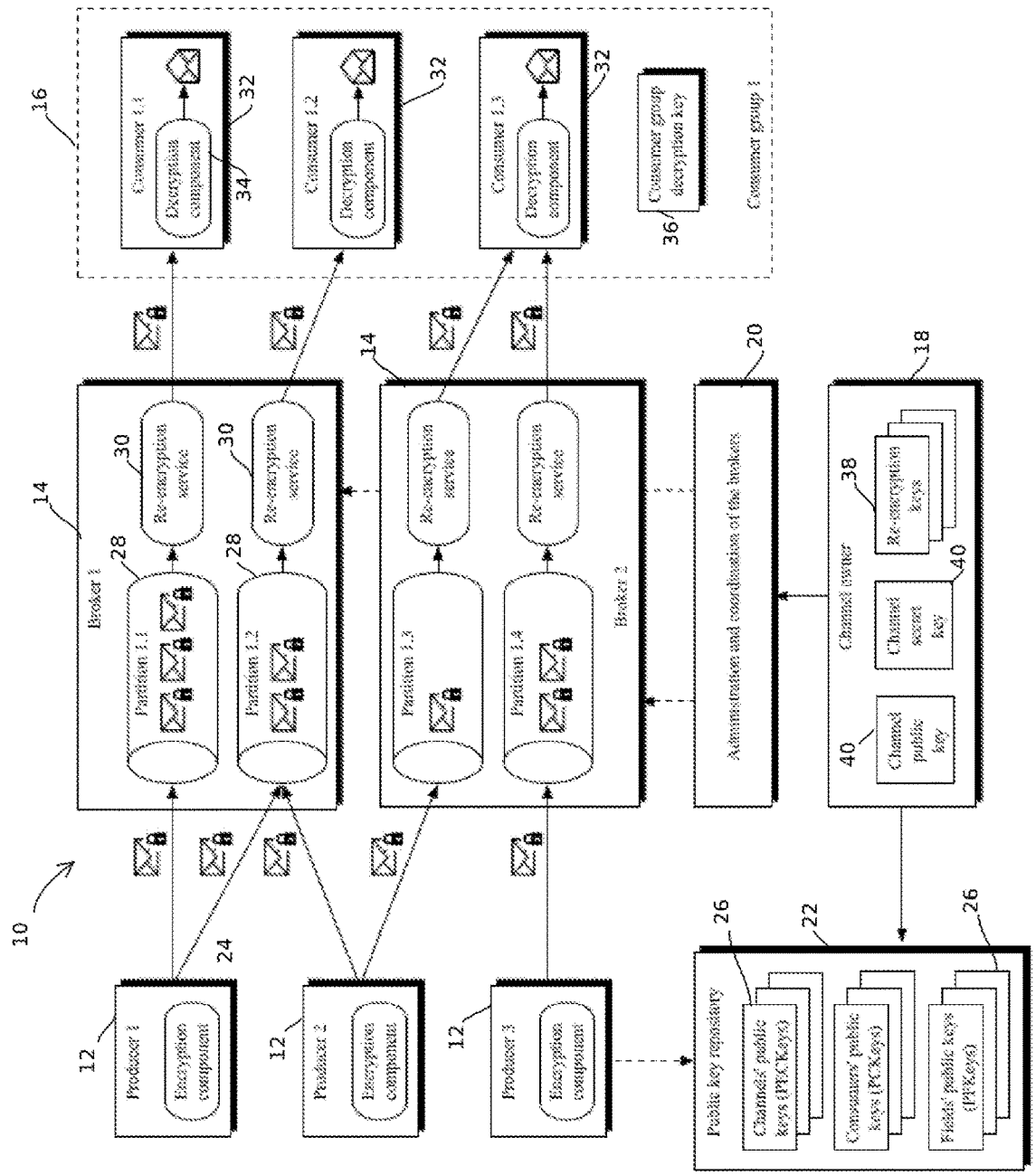
FIG. 1 illustrates an example logical architecture consistent with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of distributed application development and cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments include a computer system and method that affords delegated access to encrypted information for distributed messaging and queuing frameworks, or in general, to publish-subscribe architectures. In said frameworks and other architectures, data may be published by data producers and organized in channels or queues, which consumer applications can subscribe to, and that are managed by one or multiple broker entities.

In some cases, these techniques are implemented with proxy re-encryption, which is a type of public-key cryptosystem that transforms data encrypted under an initial public key to into a ciphertext readable by a different private key from that of the initial public key, without being decrypted in this process by the delegator. In some embodiments, data is initially encrypted by producer applications under a public key specific to the channel in use (e.g., in cases where full-encryption mode is in place) or under a public key for each message field (e.g., in cases where granular-encryption mode is in place), and through the re-encryption process, the system transform the ciphertexts to encrypted messages that can be deciphered by authorized consumer applications. The channel owner may previously authorize consumer applications, e.g., by creating special cryptographic keys, called re-encryption keys, that are handled to the brokers and that act as authorization tokens.

Other attempts to implement encryption in messaging frameworks or libraries have some design drawbacks, such as that the data producers often have their own keys, which they use to encrypt the data they publish to the broker system, which implies that either they have to know the consumers' keys in order to generate the corresponding re-encryption keys or that this generation is performed by a trusted entity that acts as omniscient key server and that knows all the keys involved by producers and consumers. The former generally implies that the producers must be aware at some point of the identity of consumers, which in most cases is not possible or can be extremely inefficient to attain; the latter implies that the key server is a single point of failure from the point of view of security. Either way, using producer's key to encrypt data in a pub/sub (publisher-subscriber) model is often not suitable.

In the present description, the data and messages in a channel are referred to as being owned by some "data owner" on a per-channel basis, rather than by the producer (which may be a mere data source). In some cases, keys are assigned to channel, and the channel owner may hold the associated private keys. Some embodiments include a mechanism for distributing channel's public keys to producers. Since these keys are public, a variety of approaches to distribute the public keys may be used, depending on the deployment characteristics of the system (e.g., storing them at the administration/coordination module, publishing them in a public repository, broadcasting them to the producers, etc.)

Proxy Re-encryption

Some embodiments implement a proxy re-encryption scheme. Performing an act "with proxy re-encryption" can include generating a re-encryption key, using that key to transform a ciphertext, or both. Certain existing public-key encryption schemes allow an entity holding a private key related to some public key to decrypt ciphertexts encrypted under said public key. The encryption scheme proposed by ElGamal is one example of public-key encryption scheme (see ElGamal, T. (1984, August), *A public key cryptosystem and a signature scheme based on discrete logarithms*, in *Workshop on the Theory and Application of Cryptographic Techniques* (pp. 10-18), Springer Berlin Heidelberg.) Other examples include those proposed by Blaze et al. (see Blaze, M., Bleumer, G., & Strauss, M. (1998, May), *Divertible protocols and atomic proxy cryptography*, in *International Conference on the Theory and Applications of Cryptographic Techniques* (pp. 127-144), Springer Berlin Heidelberg), and those in and Ateniese et al. (see Ateniese, G., Fu, K., Green, M., & Hohenberger, S. (2006), *Improved proxy re-encryption schemes with applications to secure distributed storage*, in *ACM Transactions on Information and System Security* (TISSEC), 9(1), 1-30.)). Each paper referenced in this paragraph is hereby incorporated by reference. A variety of different forms of proxy re-encryption are described in U.S. Patent Application 62/427,401, filed 29 Nov. 2016, titled METHOD AND SYSTEM FOR SWITCHING PUBLIC KEYS IN CIPHERTEXTS, the contents of which are hereby incorporated by reference. Examples also include those described in the following: Giuseppe Ateniese, Kevin Fu, Matthew Green, and Susan Hohenberger, *Improved Proxy Re-Encryption Schemes with Applications to Secure Distributed Storage*, in *Cryptology ePrint Archive*, at 2005/028; M. Blaze, G. Bleumer, and M. Strauss, Divertible protocols and atomic proxy cryptography, In Proceedings of Eurocrypt '98, volume 1403, pages 127-144, 1998; and D. Nuñez, I. Agudo, and J. Lopez, *Delegated Access for Hadoop Clusters in the Cloud*, in *IEEE*

*International Conference on Cloud Computing Technology and Science* (CloudCom 2014), pp. 374-379, 2014, the contents of each of which are hereby incorporated by reference.

In some cases, the proxy re-encryption scheme prevents a delegate from accessing the content of a message or from accessing a private key corresponding to the public key with which the message was encrypted. In some embodiments, the proxy re-encryption schemes provide at least the following functionalities, embodied by these algorithms:

PRE.Setup(secParam)→publicParams. On input the security parameter secParam, the setup algorithm PRE.Setup outputs an object that contains the public parameters of the scheme. In some cases, these parameters are publicly known.

PRE.KeyGen()→(pk#i, sk#i). The key generation algorithm PRE.KeyGen outputs a pair of public and secret keys (pk#i, sk#i) for entity i. The term "secret key" is also referred as "private key" in this description.

PRE.Enc(pk#i, m)→ci. On input the public key pk#i and a message m, the encryption algorithm PRE.Enc outputs a ciphertext c#i.

PRE.Dec(skf#i, c#i)→m. On input the secret key sk#i and a ciphertext c#i, the decryption algorithm PRE.Dec outputs a message m.

PRE.ReKeyGen(pk#i, sk#i, pk#j, sk#j)→rk[i→j]. On input the pair of public and secret keys (pk#i, sk#i) for entity i and the pair of public and secret keys (pk#j,sk#j) for entity j, the re-encryption key generation algorithm PRE.ReKeyGen outputs a re-encryption key rk[i→j].

PRE.ReEnc(rk[i→j], c#i)→c#j. On input a re-encryption key rk[i→j]and a ciphertext c#i, the re-encryption algorithm PRE.ReEnc outputs a second ciphertext c#j, which can be decrypted by entity j using sk#j.

In some embodiments, the proxy re-encryption scheme is non-interactive, which means that the re-encryption key generation (i.e., the PRE.ReKeyGen function) does not use the secret key sk#j (the opposite implies the scheme is interactive). Or in some embodiments, the proxy-re-encyption scheme is interactive and is, therefore also based on the subscriber's private key. Additionally, in some embodiments, the PRE scheme has access to a secure source of randomness in the form of a cryptographically secure pseudorandom number generator (CSPRNG).

Generation and Distribution of Channel Encryption Keys

The channel owner may be an entity external to the system (though some embodiments may include its features), outside its security domain in order to decouple if from the generation of channel encryption keys and re-encryption keys, and therefore, to eliminate or mitigate security risks associated to the protection of channel secret keys. Hence, this protection is assumed to be responsibility of the channel owner, which usually may resort to various solutions on this respect (e.g., use of platforms with Hardware Security Modules (like secure enclaves) and/or key management software).

In the full encryption mode, in some embodiments, each time a new encrypted channel is created (e.g., channel number i), the channel owner may create a new pair of public and secret keys, namely PECKey and SECKey, using the PRE.KeyGen function as follows:

(PECKey#i, SECKey#i)=PRE.KeyGen()

That is, PECKey#i and SECKey#i are a proxy re-encryption public and secret key, respectively.

The SECKeys may be safely stored by the channel owner, while the PECKeys may be distributed to the producers.

Some embodiments include services configured to distribute a channel's public keys to producers, and since these keys are public, embodiments may implement a variety of different distribution techniques, depending on the deployment characteristics of the system (e.g., storing them at the administration/coordination module, publishing them in a public repository, broadcasting them to the producers, etc.)

Generation of Consumer Keys

In some embodiments, consumers decrypt data using a secret key generated by themselves. This secret key, or SCKey, in some embodiments, is part of a keypair, named CKeypair. CKeypairs, in some embodiments, are generated locally by the consumer application, and some embodiments may only send the public component (i.e. the PCKey) to the administration module after that, in order to be able to Since SCKeys are secret, special care may be taken to protect them properly and must be securely erased once they are not needed. In any case, from the cryptographic point of view, CKeypairs, in some embodiments, are generated using the PRE.KeyGen function as follows:

(PCKey#j, SCKey#j)=PRE.KeyGen()

In some pub/sub systems, such as Apache Kafka™ (e.g., as described in the Internet Archive capture of 16 Feb. 2017 of https://kafka.apache.org/documentation/, the contents of are hereby incorporated by reference), sets of consumers are usually organized in consumer groups, for scalability reasons. In this case, the consumer group may be semantically considered as the subscriber, and the consumers in the group are, in many use cases, processes that allow parallelization, load balancing, or fail-safety of the consumption procedure. Therefore, in such cases, each CKeypair may belong to a whole consumer group, so consumers applications within the group share a single SCKey for decryption purposes. Generation of the consumer keys is responsibility of the entity (e.g., an orchestration service) creating the group, usually the first consumer to join the group.

Generation of Transformations Keys

A channel owner may authorize consumers to read data and messages of an encrypted channel by generating the corresponding transformation keys. For example, owner of channel i may authorize consumer j to read from the channel. To do so, it uses the PRE.ReKeyGen algorithm using the secret key of the encrypted channel (SECKey#i) and the public key of the consumer (PCKey#j), as follows:

TK[i→j]=PRE.ReKeyGen(SECKey#i, PCKey#j)

Prior generating each key, the channel owner may retrieve the PCKey of the consumer it wants to authorize. This can be achieved with a variety of approaches, e.g., either in a 'push' (i.e., the consumer attaches its PCKey when asking for authorization) or in a 'pull' fashion (i.e., the channel owner asks the consumer for its PCKey) together with the authorization request. It is also possible for the channel owner to retrieve the PCKey by other mechanisms, such as from a public key repository, so it is not necessary to interact with the consumer application.

General Flow in the Full-encryption Mode

In a traditional, non-encrypted data flow of many pub/sub systems, producers wanting to write messages to a specific channel must first establish a session with some broker of the system (the particularities of which broker and how this session is established depends on the actual pub/sub system in place) and send a write request. If this request is successful, the message is typically appended to the channel and will be ready for consumption by consumer applications. In some pub/sub systems, such as Apache Kafka™, channels (or 'topics') are further decomposed into partitions in order to maximize consumption throughput by distributing the channel in several machines, each one with one or more partitions of the channel. It should be noted that messages in the system can be represented by many different formats (e.g., JSON, XML, etc.), but in many cases, it can be assumed that all messages can be decomposed of two parts, metadata and content, without loss of generality.

The following is a description of the data flow in some embodiments. This description is best read with reference to FIG. 1. And more specific and diverse variants are described below with reference to FIGS. 1-5. Embodiments may include obtaining keys have been previously created, namely, channel encryption keys, consumer keys, and transformation keys.

When a producer wants to write one or more messages into a channel i, in some embodiments, it connects to the broker that hosts this channel and establish a session with it, generates a random data encryption key (DEK) for the session (for example, a fresh AES-128 key), and produces an encrypted version of the DEK using the proxy re-encryption algorithm as follows:

$$EDEK=PRE.Enc(PECKey\#i, DEK)$$

The EDEK, in some embodiments, is included as a part of every message sent by the producer to the broker during the session. The content of each message, in some embodiments, is encrypted with DEK while the metadata associated is kept in clear. If the system is required to interoperate with traditional message schemes, then, in some embodiments, for an encrypted message, the encrypted content and EDEK can be interpreted as the content of a message, as long as both producers and consumers agree on this. Another possibility is to include the EDEK as part of the metadata of the encrypted message, if the message format allows it.

The broker entity may store the encrypted messages, since metadata is maintained in clear in some use cases, respecting the message format in use.

Each time a consumer makes a read request for a certain channel, in some embodiments, then the broker retrieves the pending encrypted messages and passes them through its re-encryption service, which may look for the EDEK into its EDEK cache in case it was previously re-encrypted and sends the cached response (which is a TEDEK element). If the EDEK is not cached, in some embodiments, then the re-encryption service performs a re-encryption operation using the corresponding re-encryption key between the channel and the consumer. For example, assuming that the consumer is labeled as consumer j, and the channel is channel i, the re-encryption key is labeled as RK[i→j], as described before, and the re-encryption service in the broker, in some embodiments, performs the following operation:

$$TEDEK=PRE.ReEnc(RK[i→j], EDEK)$$

The re-encryption service, in some embodiments, stores the TEDEK in the cache, associated to the original EDEK, and sends it back to the consumer. The consumer application now can decrypt the TEDEK using its private key (SCKey#j), obtaining a DEK, in some embodiments, as follows:

$$DEK=PRE.Dec(SCKey\#j, TEDEK)$$

After that, in some embodiments, the consumer uses the DEK to decrypt the content of the message, which was encrypted using symmetric encryption techniques (e.g., AES-GCM), with DEK as the key. The consumer application may also cache internally the DEK decrypted from the TEDEK, in case there are more messages using the same TEDEK, to save the decryption operation.

Granular Encryption Mode

Encrypted channels, in some embodiments, may also be created in the granular encryption mode. In this case, instead of a single public key per channel, which is used to encrypt all the messages to the channel, the channel owner can establish granular encryption policies per message field, assuming all the messages in the channel share a common field-value format.

Without loss of generality, in some embodiments, it can be assumed that the message format of such channels follows a recursive structure of field-value pairs, {field1: value1, field2:value2, fieldN:valueN}, where each value may be, in turn, another structure of field-value pairs. Example of such a format is the JSON format.

In the granular encryption mode, in some embodiments, channel owners do not use a single ECKeypair, and there will be per-field keys instead of a single per-channel key. In some embodiments, channel owners use a single per-channel secret of proper size (>256 bits), which is randomly (e.g., pseudo-randomly with an appropriate seed) generated. The present disclosure denotes this element as ChannelSecret.

The channel owner, in some embodiments, may derive keys for the desired fields in the message format using a key derivation procedure on the ChannelSecret. Inputs to the key derivation procedure, in some embodiments, are the following parameters: (i) the ChannelSecret; (ii) the field name (F); and (iii) an optional salt value.

$$FKeypair\#F=KeyDerivation(ChannelSecret, F, [salt])$$

A variety of different KeyDerivation procedures can be used and can depend on the PRE scheme in use. One method, in some embodiments, is to use a Key Derivation Function (KDF) over the aforementioned parameters to derive an auxiliary secret of enough size (e.g., ≥256 bits) and use this secret to seed a CSPRNG, which is used in the Key Generation algorithm of the PRE scheme (i.e., the PRE.KeyGen function). In some PRE schemes, public keys are computed with a deterministic function over the secret key, and admit to directly use the auxiliary secret as secret key, removing the need of the CSPRNG during key generation. In some embodiments, the result of this process is a keypair, referred to as FKeypair and consisting of a public key (PFKey) and a secret key (SFKey), for the corresponding field name. Since this keypair is derived from the ChannelSecret, in some embodiments, then it is also owned by the channel owner. Public keys of fields (PFKeys) may require the same distribution mechanisms, in some embodiments, as public keys of channels in the full encryption mode (e.g., storing them at the administration/coordination module, publishing them in a public repository, broadcasting them to the producers, etc.).

For each FKeypair, in some embodiments, the channel owner may establish different decryption policies by authorizing consumers on a per-field basis by means of transformation keys. For example, the owner of a channel with a field i may authorize consumer j to read this field in messages of this channel. To do so, in some embodiments, it uses the PRE.ReKeyGen algorithm using the secret key of the field (SFKey#i) and the public key of the consumer (PCKey#j), as follows:

$$TK[i→j]=PRE.ReKeyGen(SFKey\#i, PCKey\#j)$$

Prior generating each key, the channel owner may retrieve the PCKey of the consumer it wants to authorize, as in the full channel encryption mode.

General Flow in the Granular Encryption Mode

When a producer (the producer, the broker, the consumer and the other entities herein being different computing entities, like computing devices, processes, hosts, virtual machines, containers, or the like) wants to write one or more messages into a channel, in some embodiments, it connects to the broker that hosts this channel and establish a session with it, generates a random data encryption key for each encrypted field during the session (each key denoted as DEK#f), retrieves the public key of each field (each public key denoted as PFKey#f) and produces an encrypted version of each DEK#f using the proxy re-encryption algorithm, in some embodiments, as follows:

EDEK#f=PRE.Enc(PFKey#f, DEK#f)

The corresponding value of each message field f is encrypted, in some embodiments, with DEK#f using symmetric encryption, while the field name associated is kept in clear. The result of encrypting a field value value#f with a DEK is denoted as evalue#f. The EDEK#f is included as a part of the corresponding encrypted value evalue#f for the message field during the session.

The following examples illustrate the encryption process with the granular encryption mode. Suppose the following simple message format {field#1:value#1, field#2:value#2}, and that the channel owner produces encryption keys only for field#1; then, in some embodiments, encrypted messages will follow a format like the following (or other equivalent ways):

{field#1:[EDEK#1, evalue#1], field#2:value#2}

The following is another example, with a message format with compound fields:

{field#1:value#1, field#2:{field#2.1:value#2.1, field#2.2:value#2.2}}

In this case, field#2 is composed of two fields, and the channel owner produces keys only for fields field#1 and field#2.1; then, encrypted messages will follow a format like the following (or other equivalent ways):

{field#1:[EDEK#1, evalue#1], field#2:{field#2.1:[EDEK#2.1, evalue#2.1], field#2.2:value#2.2}}

The broker entity, in some embodiments, stores the encrypted messages. Each time a consumer makes a read request for a certain channel, in some embodiments, then the broker retrieves the pending encrypted messages and pass them through its re-encryption service, which looks for the field EDEKs within the message into its EDEK cache in case they were previously re-encrypted. If an EDEK is not cached, in some embodiments, then the re-encryption service performs a re-encryption operation using the corresponding transformation key between the field and the consumer. For example, assuming that the consumer is labeled as consumer j, and the field is field f, the transformation key is labeled as RK[f→j], as described before, and the re-encryption service in the broker, in some embodiments, performs the following operation:

TEDEK=PRE.ReEnc(RK[f→j], EDEK)

Once the transformed EDEKs (or TEDEKs) are obtained, in some embodiments, either via cache or by the re-encryption service, the broker may substitute the EDEKs in the message by the corresponding TEDEKs and sends the modified message to the consumer. The consumer application, in some embodiments, now can decrypt the TEDEKs in the message using its private key (SCKey#j), obtaining a DEK for each TEDEK, as follows:

DEK=PRE.Dec(SCKey#j, TEDEK)

After that, in some embodiments, the consumer uses each DEK to decrypt the content of the corresponding field, which was encrypted using symmetric encryption techniques (e.g., AES-GCM), with DEK as the key. The consumer application may also cache internally the DEKs decrypted from the TEDEKs, in case there are more messages using the same TEDEK for a given field, to save the decryption operation.

Figure 4:
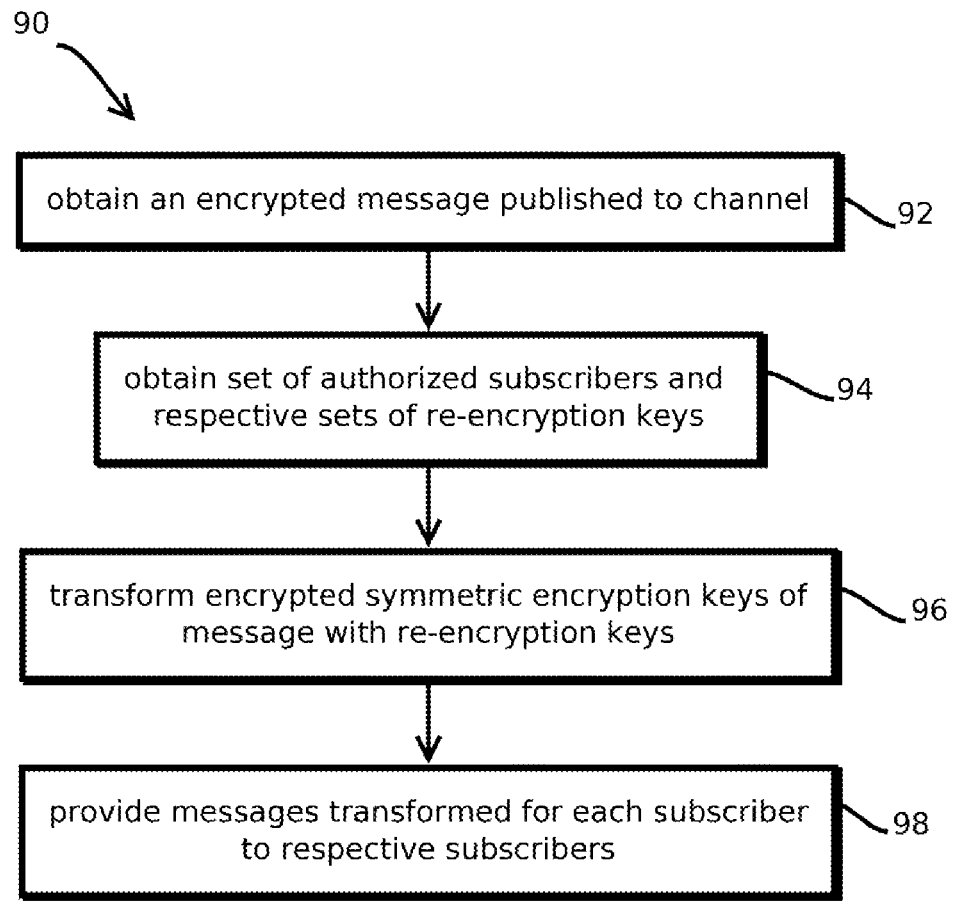
FIG. 4 illustrates a process to transform encrypted messages consistent with some embodiments.
Figure 5:
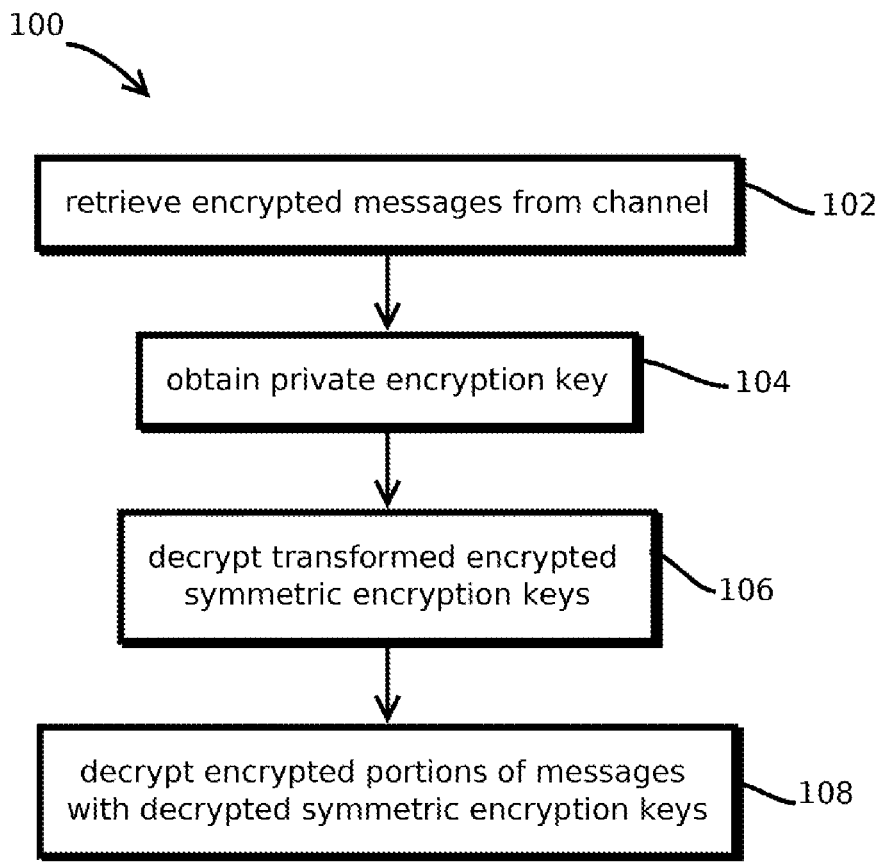
FIG. 5 illustrates a process to decrypt transformed encrypted messages consistent with some embodiments.
Figure 6:
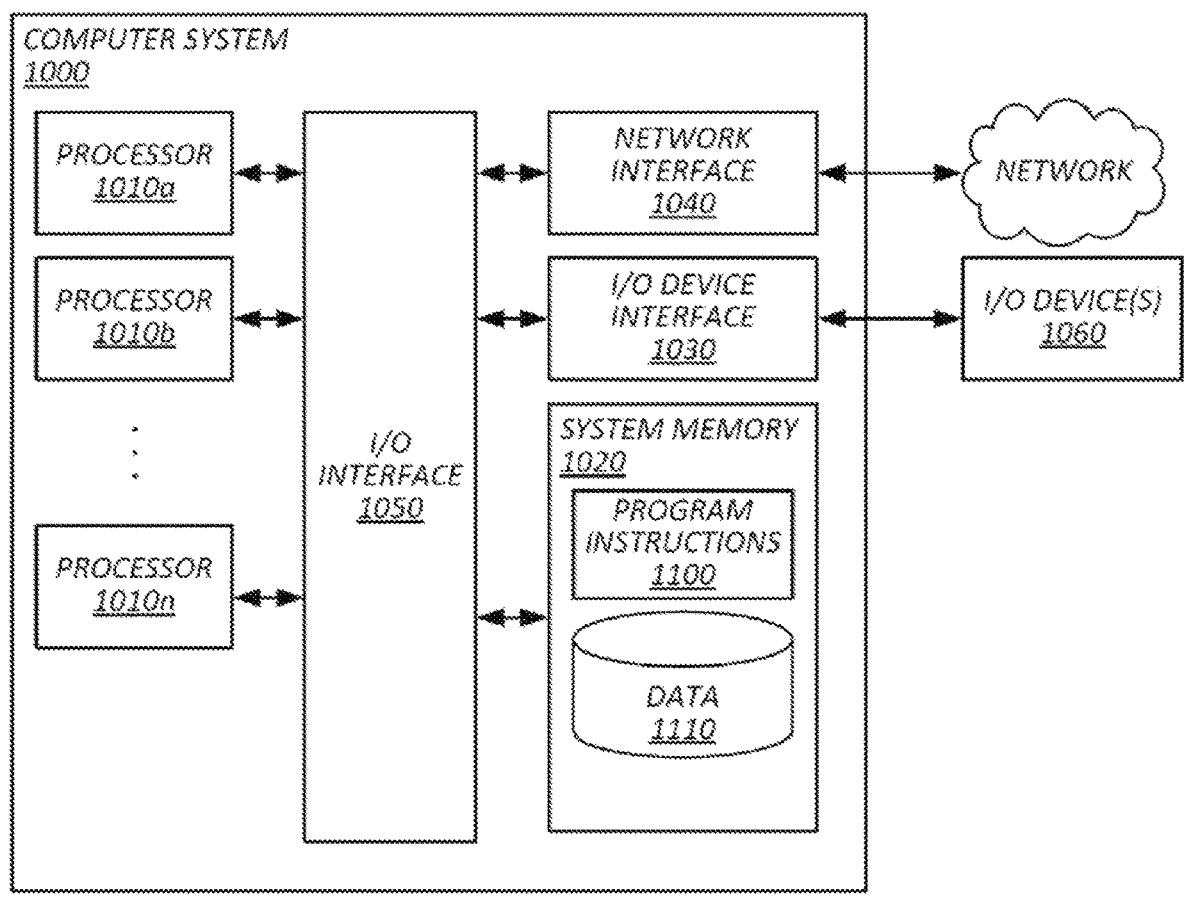
FIG. 6 illustrates an example of a computing device by which the present techniques may be implemented.

In some embodiments, the above and related techniques may be implemented in a computing environment 10 shown in FIG. 1, e.g., on a plurality of computing devices like that of FIG. 6, for instance, by executing processes like those shown in FIGS. 2-5. In some embodiments, the computing environment 10 may include a publish-subscribe application implemented with a plurality of brokers 14. In some embodiments, this application may be a distributed application executed on a plurality of different computing devices, and some cases on a plurality of different virtual machines or containers on those computing devices. In some embodiments, the publish-subscribe application is part of a larger distributed application, such as a website, gaming system backend, application program interface, or the like in which various processes reflected by the illustrated producers 12 inject information into the publish-subscribe application, the publish-subscribe application may routes that information in real-time and in sequence to a plurality of processes represented by groups of subscribers or other consumers 16, and those consumer processes execute operations in response to the conveyed information.

In the illustrated example, three data producers 12 are illustrated, but commercial implementations are expected to include substantially more, such as more than 10, more than 100, or more than 10,000 data producers, which may be distinct processes, microservices, computing devices, or other sources of information configured to send requests to convey that information on designated channels to the publish-subscribe application. Producers may be, for example, services of a micro-services architecture, data from various sensors, lambda functions in serverless architectures, client-side code capturing user inputs to a user interface to be sent for server-side processing at the publish-subscribe application, and the like. In another example, producers may be load balancers sitting behind a web server that route work to different data consumers via the publish-subscribe application.

In some embodiments, producers 12 may communicate with consumers 16 on a channel-by-channel bases, with different consumers subscribing to different channels, and with units of communication being referred to as messages. In some embodiments, a given producer may send a given message on one or more channels, and a given consumer may subscribe to one or more channels. A message on a given channel may be sent to every consumer that subscribes to that channel (though in some cases only a subset of the consumers may be able to decrypt some or all of that message in some embodiments described herein). In some embodiments, messages may be conveyed in real-time in a streaming format, for instance, within less than one minute of when the message is received by the publish-subscribe application, less than 10 seconds, less than one second, less than 500 ms, or less than 100 ms. In some embodiments, the ordering of the message within a channel may be preserved and conveyed to subscribers. For example, messages may be augmented to include timestamps, stored in data structures that preserve ordering like stacks or lists, augmented with sequence numbers, or the like. The term "message" as used herein should be read broadly to include either the message content injected into the system by the data producer or that message content along with accumulated information that follows the message through the system, like timestamps, encryption keys, channel identifiers, or subsets thereof. For example, statements that a "message is encrypted" do not require that both the message content and a timestamp appended to that message be encrypted, as it is enough to encrypt the message content in this example, or some other field.

In some embodiments, messages may have formats, like a schema. In some cases, messages are conveyed in a hierarchical serialization format, like JavaScript object notation (JSON) or extensible markup language (XML). In some embodiments, messages may include a plurality of fields, which in some cases may be data associated with keys in keyvalue pairs in such a data serialization format or data associated with terms in a dictionary in such a data serialization format. In some embodiments, producers may access channel-specific data schemas and format messages according to the schema, for example, by populating various entries under various fields. Or in some cases, multiple schemas may apply to a single channel. In some embodiments, data formats are defined by application program interfaces of consumer processes with which the producers are communicating. In some embodiments, schemas may indicate which fields are to be encrypted, and in some cases, which channels are to be used to convey messages complying with the schemas and which consumer groups or consumers are to be granted access to messages under the schemas. Or in some cases entire messages may be encrypted, for example, in a single ciphertext.

In some embodiments, to this end or others, producers may include an encryption component 24 configured to encrypt messages in a manner specified by schema before those messages are emitted by respective producers 12. In some embodiments, this encryption may be applied to both data at rest and in transit. For example, the encryption may be applied without first establishing a secure channel with a broker or in addition to establishing a secure channel of communication by the producer with the publish-subscribe application. For example, the presently described encryption may be a distinct layer of encryption from that applied in, for example, transport layer security encryption (or SSL) applied to data in flight.

In some embodiments, the publish-subscribe application may process a relatively large number of messages at a relatively high rate, such as more than 100 messages per second, more than 1000 messages per second, or more than 10,000 messages per second, in some cases with messages being conveyed between data centers over a relatively large geographic areas, such as more than 10,000 km², like areas larger than the United States, such as across the world.

In some embodiments, the data producers 12 may execute a process described below with reference to FIG. 2 to encrypt messages based on a public cryptographic key (also called a public encryption key) or set of public cryptographic keys associated with (for instance in a one-to-one association) a channel on which the encrypted message is to be conveyed. In some embodiments, the encryption may implement a hybrid encryption scheme in which the messages are first encrypted with a symmetric cryptographic key, such as a random value with greater than 127 bits of entropy, greater than 255 bits of entropy, or greater than 511 bits of entropy, and then that symmetric key is encrypted with an asymmetric encryption algorithm by encrypting the symmetric key with the public key of the channel. Or in some cases, different symmetric keys may be used to encrypt different fields of a given message and each of those different symmetric keys may be encrypted with the same public cryptographic key of the channel, or with field-specific public cryptographic keys of the channel on which the message is to be conveyed. This two-stage encryption approach is expected to afford certain scaling advantages in subsequently described transformations, such as re-encryption, for example, with proxy re-encryption, and the encrypted symmetric encryption key may be relatively fast and impose a predictable amount of computational and network load compared to re-encrypted message fields that may vary in size and in some cases be relatively long.

In some embodiments, producers 12 may send messages by calling a publish application program interface of the publish-subscribe application including brokers 14. In some embodiments, a schema of this API may specify various parameters, such as the content of the message to be conveyed, a value by which the data producer 12 indicates one or more channels on which the messages to be conveyed, and a command to convey the message. In some embodiments, the data producers 12 do not have access to which consumer processes or groups 16 of consumer processes that subscribe to a channel on which the message is requested to be conveyed. For example, producers 12 may not have access to the identity or network address of consumers that subscribe to a channel, thereby shielding developers of producers for managing this complexity and affording relatively manageable elastic scaling of resources on the consumer side by abstracting away service discovery from the producers.

In some embodiments, messages may be allocated to the appropriate channel, sequenced, transformed, and delivered to subscribing consumers by respective brokers 14. In some embodiments, the data brokers 14 may be implemented in a relatively fault-tolerant architecture in which illustrated features are replicated on distinct computing devices, such that failure of a given computing device does not prevent a given message from being delivered. In some embodiments, each broker may include a plurality of partitions 28 and a re-encryption service 30 associated with each partition. In some embodiments, partitions may correspond to different channels, for instance, with each channel having one or more partitions specific to that channel, or in some cases, a given partition may service multiple channels. In some embodiments, the brokers may be managed by an administration module 20 of the publish-subscribe application, and in some cases the publish-subscribe application may execute a process described below with reference to FIG. 4 to route messages to subscriber consumer processes and delegate access to designated subscriber consumer processes with proxy re-encryption. In some embodiments, each broker may manage a different channel, or in some cases a plurality of channels may be processed by single broker, or one channel may be processed by a plurality of brokers.

In some embodiments, a channel owner service 18 may execute in a different security domain from the other described components and may determine which subscribers to a given channel are to be delegated access to which information on that channel, such as which messages or which fields of messages. To effectuate these results of these determinations, the channel owner service 18 may execute a process described below with reference to FIG. 3 to generate consumer-set-specific transformation keys for designated channels, and in some cases field-and-consumer-set specific transformation keys for given channels. In some cases, these transformation keys (also called re-encryption keys) may be conveyed outside the security domain of the channel owner service 18 to the re-encryption services 30, which may use the re-encryption keys to transform encryption that is only accessible with a secret encryption key of the channel owner into encryption that is only accessible with a secret encryption key of a set of designated consumers to which access is delegated.

In some embodiments, access to different fields in messages on a channel may be differently allocated to different sets of consumer processes. For instance, different consumer groups 16 may be granted access to different sets of fields with different corresponding sets of re-encryption keys. In some embodiments, different messages on a channel may have different access grants to different consumer processes, for instance, one set of consumer processes may be delegated access to messages having a field with a value indicating a geographic region corresponding to North America, while a different set of consumer processes may be delegated access to messages on the same channel having a field designating South America. In some embodiments, the re-encryption services 30 may apply various criteria or other rules associated with sets of re-encryption keys to messages to determine which sets of re-encryption keys to apply to which messages and which portions of messages. In some embodiments, such rules may further include rules specifying a set of re-encryption keys are to be applied to messages having a timestamp within a designated range of time, to messages with a prefix or suffix of a ciphertext of message content satisfying a regular expression (like delegating access to messages with a ciphertext that ends in a 0 to one consumer process and delegating access to messages with a ciphertext that ends in a 1 to another consumer process), a rule specifying that a smaller set of fields are to have access delegated to consumers for messages emanating from (or corresponding to users in) Europe than in those emanating from the United States, and the like.

In some embodiments, a given field in a given message may have access delegated to different consumer processes in different security domains from one another, such that processes in one security domain do not have access to secret (also referred to as private) encryption keys of encryption key pairs for which a public encryption key was used to generate re-encryption keys used on the given field. In this scenario, in some embodiments, multiple transformed encrypted symmetric encryption keys for the field may be appended to the message, for instance, in association with respective identifiers of the corresponding consumer process having a secret encryption key suitable for decrypting the corresponding transformed encrypted symmetric encryption key. Consumer processes receiving these messages may parse these keyvalue pairs to select the one associating their identifier with the corresponding transformed encrypted symmetric encryption key, and upon detecting their identifier (which may be their public encryption key), select the corresponding one of the multiple transformed encrypted symmetric encryption keys to decrypt with their corresponding private encryption key. Or in some cases, different versions of the message with different corresponding transformed encrypted symmetric encryption keys may be provided to different sets of consumer processes depending upon which consumer-set-specific re-encryption keys were used to transform encryption in the respective message.

In some embodiments, the channel owner service 18 may generate re-encryption keys based on a set of public-private encryption key pairs for a channel (like one for each field subject to encryption to which access is separably delegable) and a public encryption key of a set of consumers to which access is to be delegated. In some embodiments, the channel owner service may generate re-encryption keys without decrypting the encrypted symmetric keys or the underlying ciphertext encrypted with those symmetric keys. In some embodiments, the channel over owner service may generate the re-encryption keys without the message, and encrypted portion thereof, or any portion thereof in some cases, entering the security domain of the channel owner service 18. In some embodiments, the channel owner service 18 may generate the re-encryption keys without the private encryption key of the set of consumers to which access is delegated entering the channel owner service's security domain. As a result, in some embodiments, the channel owner service 18 may maintain a relatively limited attack surface with a relatively narrow channel of communication. Further, the channel owner 18 may delegate access with relatively low bandwidth and relatively low latency communication with the portions of the publish-subscribe application outside the security domain of the channel owner, thereby facilitating physical architectures that are potentially more secure, such as physical architectures in which the channel owner service 18 is executed on a different subnet, in a different physical facility, on a different computing device, on a different processor, or otherwise isolated from the other portions of the publish-subscribe application.

The illustrated environment 10 includes a single consumer group 16 with a plurality of consumer services 32 though embodiments are expected to include substantially more in commercial deployments, such as more than two, more than five, more than 50, or more than 1000. The illustrated consumer group 16 includes three consumer processes 32, though again some consumer groups are expected to include substantially more, such as more than 10, more than 50, or more than 1000. In some embodiments, the consumer services 32 may each be different hosts on a network or set of networks, or in some cases the consumer services 32 may be different processes within a given computing device or combination thereof. In some embodiments, a service may be both a data producer and a consumer. For example, various stream processing applications, like Apache Flink™, Apache Storm™, Apache Spark™, and the like may execute real-time complex event processing on messages on channels to which they subscribe and then output results as messages on other channels in which they serve the role of data producer.

In some embodiments, each consumer group may have a set of consumer group decryption keys, which may be private encryption keys corresponding to the public encryption keys with which the channel owner service 18 generates the re-encryption keys for the channel for the consumer group. In some embodiments, each consumer service 32 may include a decryption component 34 operative to access the private decryption key of the consumer group, decrypt the transformed encrypted symmetric encryption key or set thereof appended to (or otherwise associated with) the message, and then decrypt the corresponding ciphertext in the message with the accessed symmetric encryption keys, in some cases on a field-by-field basis. In some embodiments, each consumer group 16 may be in a different security domain, such that the private encryption key used by that consumer group is not accessible outside of that consumer group, for instance, to other components of the illustrated computing environment 10. In some embodiments, the consumer group 16 may maintain these keys in a consumer group decryption key management system 36, which in some cases may publish the public cryptographic key corresponding to the private encryption key to the other components outside the security domain of the consumer group 16, for instance, to the channel owner service 18, and some cases in association with an identifier of the consumer group if distinct from the public key.

In some embodiments, the administration module 20 may be configured to route re-encryption keys to the appropriate re-encryption service on behalf of the channel owner 18 and manage operation of the illustrated brokers 14. Further, in some embodiments, the administration module 20 may be configured to detect failed partitions or brokers and instantiate new instances thereof. In some embodiments, the administration module 20 may be configured to elastically scale a number of brokers, partitions, or servers therein according to an amount of workload. In some embodiments, partitions 28 may be implemented with fault-tolerant collections of redundant servers, such as a plurality of servers including a leader server and a plurality of follower servers that replicate the leader server. Upon failure of a leader server, some embodiments of the follower servers may elect a new leader server, for instance, with RAFT or Paxos or other decentralized consensus algorithms, or in some cases the administration module 20 may select a new leader server.

As mentioned, the channel owner service 18 may be configured to cause access to be delegated. To this end, the channel owner service 18 may reside within a security domain in which channel-specific sets of private encryption keys 40 are accessible. Generated re-encryption keys may be stored and distributed from a key repository 38 in the security domain of the channel owner 18. In some cases, the channel owner 18 may publish public keys thereof to the a public-key repository 22 accessible by data producers 12, and in some cases with associated values mapping public keys to channels, to message formats on those channels, and to fields within those message formats. In some embodiments, the channel's secret keys (also called private encryption keys) are not accessible outside the security domain of the channel owner service 18, for example to the data producers 12, the data brokers 14, or the consumer services 16, or the administration module 20. In some embodiments, the channel owner service 18 may provide the re-encryption keys directly to the consumer groups 16 to which the re-encryption keys apply, and the consumer groups 16 may convey those re-encryption keys to the re-encryption services 30, for example, as access tokens in access requests. Or in some cases the re-encryption services 30 may reside within the security domain of the consumer groups 16, and the illustrated transformations may be executed further downstream.

In some embodiments, the producers 12 may obtain the channel-specific sets of public encryption keys 26 from the public-key repository 22. For example, upon determining to send a message on a given channel in a given format, a producer 12 may send a query to the public key repository 22 for a set of public encryption keys of the channel owner service 18 corresponding to that format and receive the keys in response.

A single channel owner service 18 is illustrated, but some embodiments may include substantially more, each in a different security domain, such that private cryptographic keys thereof are not accessible to the different channel owner services other than the channel to owner to which the keys pertain. In some embodiments, a given channel owner service's security domain may correspond to multiple channels or one and only one channel.

Figure 2:
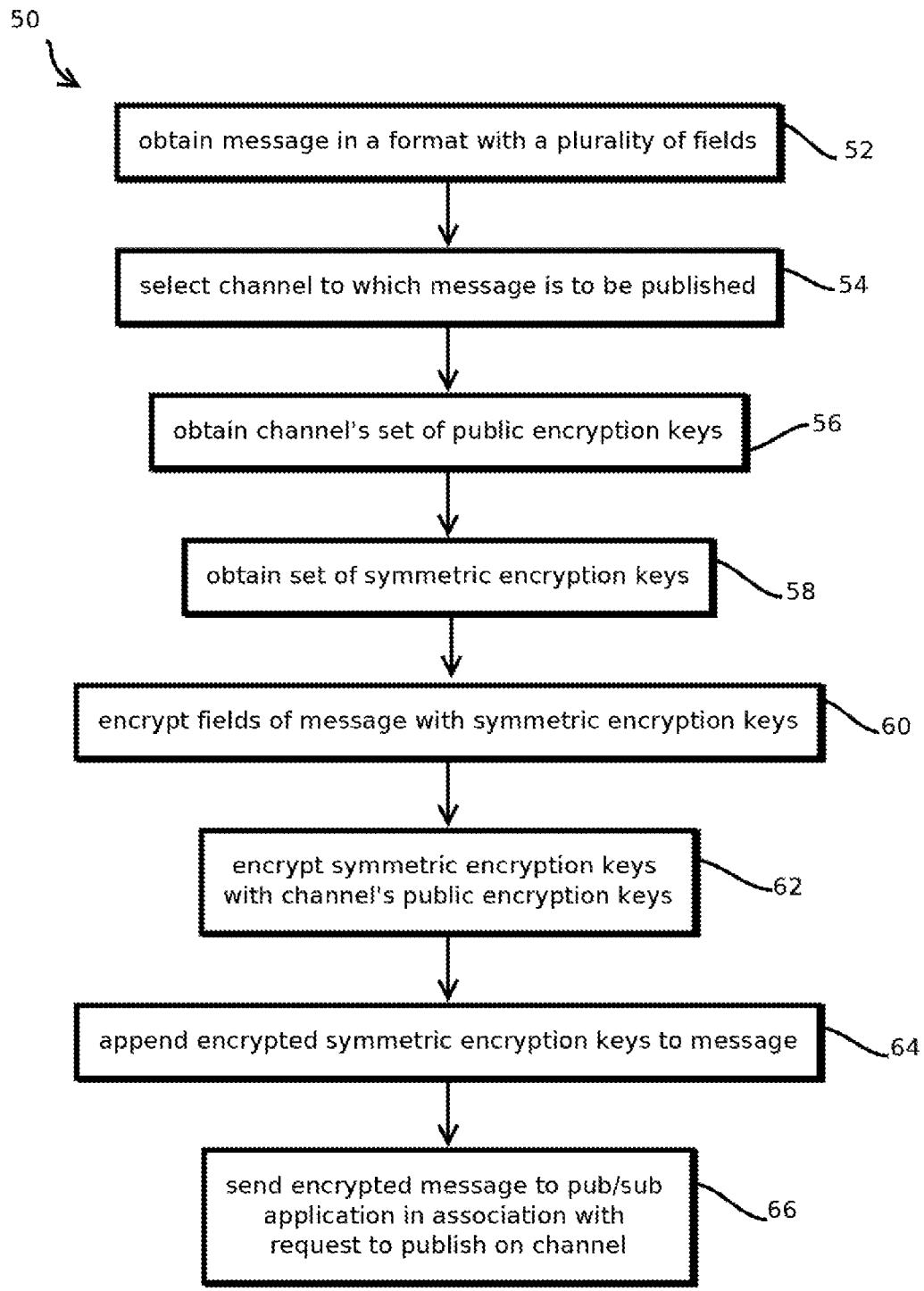
FIG. 2 illustrates a process to publish messages consistent with some embodiments.

FIG. 2 is a flowchart depicting an example of a process 50 that may be executed by one or more of the above-describe data producers 12, though embodiments are not limited to that implementation, which is not to suggest that any other description herein is limiting. In some embodiments, instructions by which the process 50, the other processes herein, and the other functionality herein are implemented may be stored on a tangible, non-transitory, machine-readable medium, such that when those instructions are executed, the described operations are effectuated. Notwithstanding use of the singular term "medium," those instructions may be distributed on different storage devices on different computing devices, such that different computing devices execute different subsets of the instructions, an arrangement consistent with use of the singular term "medium." The illustrated operations may be executed in a different order, operations may be omitted, operations may be inserted, operations may be executed concurrently, operations may be executed serially, and the processes may otherwise be varied, none of which is to suggest that any other description herein is limiting.

In some embodiments, the process 50 begins with obtaining a message in a format with a plurality of fields, as indicated by block 52. Some embodiments may then select a channel to which the message is to be published, as indicated by block 54. In some embodiments, the channel may correspond to an application program interface of a set of consumer processes for which services are requested. Some embodiments may then obtain the channel's set of one or more public encryption keys, as indicated by block 56. In some embodiments, the set may be a set of one, and the format may indicate that the entire message content is to be encrypted in a single ciphertext with the single public encryption key. Or in some cases, different fields of the message may have different corresponding public encryption keys. Some embodiments may obtain a set of symmetric encryption keys, as indicated by block 58. In some cases, the symmetric encryption keys may be random (pseudorandom with a suitable sued seed value, like based on thermal noise or electromagnetic noise) of greater than, for example 127 bits of entropy. In some cases, each resulting ciphertext to be generated may have a different symmetric encryption key. In some embodiments, the symmetric encryption key is generated by the producer and not shared by the producer outside the security domain of the producer other than in the form produced by encrypting the symmetric key with the public encryption key to which a corresponds. To this end, some embodiments may encrypt fields of messages with symmetric encryption keys, as indicated by block 60, for example by XOR'ing content of the fields with the symmetric key. Some embodiments may then encrypt the symmetric encryption keys with the channel's corresponding public encryption key, as indicated by block 62. Some embodiments may then merge the encrypted symmetric encryption keys with the message, as indicated by block 64, for instance associating within the message the encrypted symmetric encryption key of a field with that fields ciphertext.

Encrypted symmetric encryption keys may be associated with messages with a variety of techniques, including by adding the encrypted symmetric encryption keys to a separate data structure associated with the message in an index or by concatenating (or inserting) the symmetric encryption keys to (or in) a sequence of bits encoding the message, for instance prepending, appending, or otherwise inserting (which may include forming a new instance with the added information).

Some embodiments may send the encrypted message to a publish-subscribe application in association with the request to publish on a channel, as indicated by block 66. In some embodiments, this may include a publisher composing an application program interface calls to the above-described set of broker components that effectuate the publication of the message.

Figure 3:
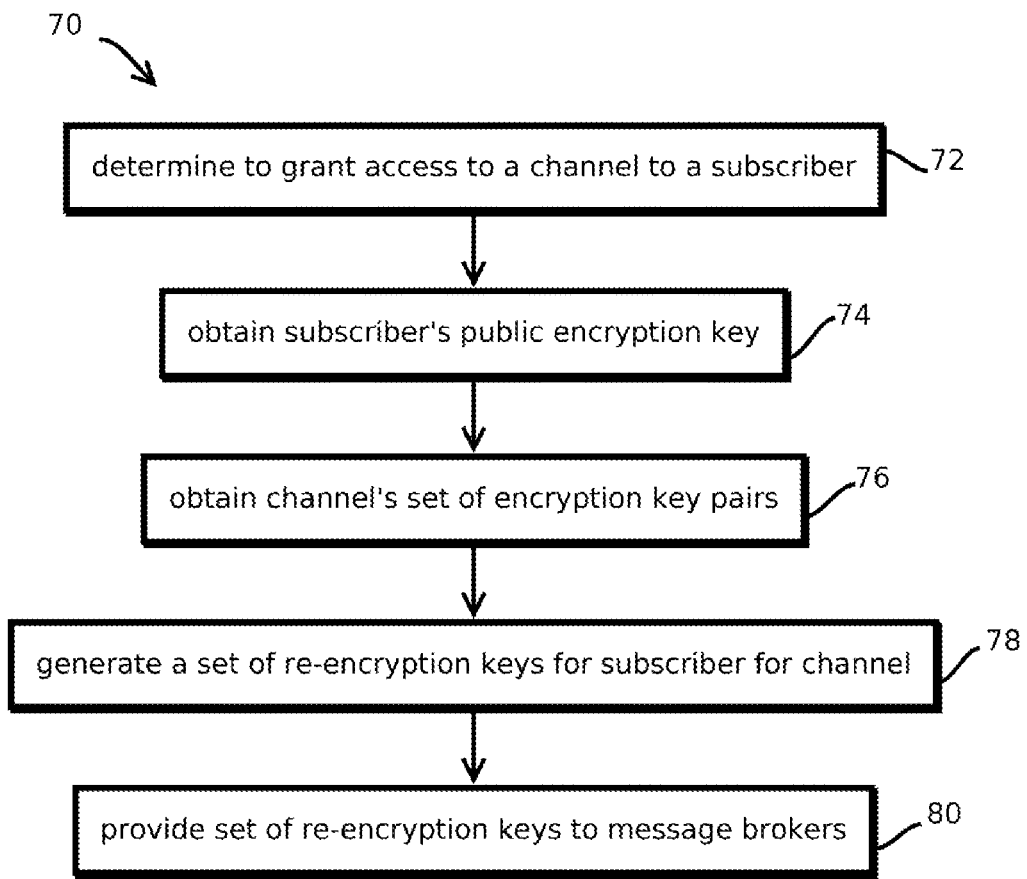
FIG. 3 illustrates a process to delegate access consistent with some embodiments.

FIG. 3 shows an example of a process 70 by which re-encryption keys are generated to delegate access to a channel to a subscriber. In some embodiments, the process 70 may be executed by the above-described channel owner service 18. Some embodiments may determine to grant access to a channel to subscriber, as indicated by block 72. In some embodiments, the determination may be made responsive to a request by a consumer service, such as an authenticated request containing credentials by which a trusted party has designated the consumer as being an appropriate subscriber. In some embodiments, the determination may be a determination to grant access to a group of subscribers. In some cases, the determination may be a determination to grant access to a subset of messages on the channel or a subset of fields of messages on the channel.

Some embodiments may obtain the subscriber's public encryption key, as indicated by block 74, which may be part of a public-private encryption key pair in which the private encryption key is held within a security domain of the subscriber, such as a consumer, and not revealed outside of that security domain to other components. In some embodiments, the public encryption key may be received as part of a request to grant access and may serve as an identifier of the subscriber.

Some embodiments may obtain the channel set of encryption key pairs, as indicated by block 76. In some cases this may be a single encryption key pair having a public encryption key and a private encryption key, where the public encryption key is provided to publishers to facilitate encryption of inbound messages. In some cases, the set may include a set of field-specific or rule-specific encryption keys selectively a pride to different subsets of messages were fields. In some embodiments, the process 70 may include generating a set of re-encryption keys for the subscriber for the channel, as indicated by block 78. In some cases, the set of keys may be specific to the subscribers public encryption key and to the channels public encryption key, or set thereof. Some embodiments may provide the set of re-encryption keys to message brokers, as indicated by block 80. Or in some cases the re-encryption keys may be provided to the subscriber for use with API calls in the form of a authentication token that is used by brokers to transform messages, or the set of re-encryption keys may be held by the subscriber for purposes of transforming encryption by the subscriber.

FIG. 4 shows an example of a process 90 by which brokers transform encrypted messages to grant access to a subscriber. In some embodiments, the process 90 includes obtaining an encrypted message published to a channel, as indicated by block 92. Some embodiments obtain a set of authorized subscribers and respective sets of re-encryption keys for the subscribers, as indicated by block 94. In some embodiments, each group of consumers may have its own respective set of re-encryption keys for a channel, and each re-encryption key in the set may correspond to a different subset of fields of the message. Or embodiments may apply a single re-encryption key to the entire message. Some embodiments may transform the encrypted symmetric encryption keys of the message with re-encryption keys, as indicated by block 96. In some embodiments, the transformation may be effectuated with proxy re-encryption, such that the encrypted symmetric encryption keys are transformed from a ciphertext that is decryptable with the channel's private encryption key to a ciphertext that is decryptable with the subscriber's private encryption key. In some cases, the transformation is performed without decrypting the encrypted symmetric encryption keys. In some cases, the transformation is performed without having access to a private encryption key of a public encryption key with which the encrypted symmetric encryption keys are encrypted. In some embodiments, transformation may be performed in response to receiving the encrypted message, without waiting for a request for the encrypted message from a subscriber. In some cases, transformation may be performed in response to receiving a request for the message from a subscriber. Some embodiments may provide the messages transformed for each subscriber to respective subscribers, as indicated by block 98. In some embodiments, messages may be added to a queue for the subscriber, messages may be pushed to the subscriber (or pulled), and different versions of the message may be provided to different subscribers with different transformations, or each subscriber may receive the same version of the message with only a subset of the encrypted symmetric encryption keys post transformation being decryptable by a respective subscriber.

FIG. 5 shows an example of a process 100 by which encrypted messages are accessed by consumers or other subscribers. Some embodiments include retrieving encrypted messages from a channel, as indicated by block 102. Messages may be retrieved in virtue of those messages being pushed, or messages may be retrieved by pulling messages from a queue, in some cases from a consumer-specific queue for the channel. In some cases, such queues may be first-in-first-out queues or last-in-first-out queue. Some embodiments may obtain private encryption keys of the respective consumer, as indicated by block 104. Some embodiments may decrypt the transformed encrypted symmetric encryption keys with the obtained private encryption key or keys, as indicated by block 106. Some embodiments may then decrypt encrypted portions of messages with decrypted symmetric encryption keys, as indicated by block 108. (Or some embodiments may encrypt the message content directly with the public encryption key of the channel, using a purely asymmetric encryption scheme rather than a hybrid scheme.) Thus, consumers may access the encrypted portions of the message. In some cases, certain consumers may only access certain subsets of the message in virtue of not having transformed encrypted symmetric encryption keys for subsets to which they are not granted access.

In some cases, access may be revoked for one consumer among a set granted access to a channel. To this end, some embodiments may change the public-private encryption key pair of the channel, update the data producers with the new public key, and generate new re-encryption keys for all consumers for which access was grated other than that for which access is revoked.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. One or more tangible, non-transitory, machine readable media storing instructions that when executed by one or more processors effectuate operations comprising: receiving, with a publish-subscribe application executed by one or more processors, from a first data producer, a first message and a first request to publish the first message to a first channel specified by the first request, wherein: at least part of the first message is encrypted by the first data producer, the first data producer is one of a plurality of data producers for which the publish-subscribe application publishes messages, the first channel is one of a plurality of channels on which the publish-subscribe application publishes messages on behalf of the plurality of data producers, at least part of the at least part of the first message is decryptable with a first private encryption key of a first public-private encryption key pair associated with the first channel, each of the plurality of channels is associated with at least one different respective public-private encryption key pair among a plurality of public-private encryption key pairs, private encryption keys of the public-private encryption key pairs are maintained in a first security domain, the plurality of data producers are external to the first security domain, and public encryption keys of the public-private encryption key pairs are accessible to the plurality of data producers; determining, with the publish-subscribe application, that a first subscriber is to be granted access to at least part of messages published to the first channel, wherein: the first subscriber is one of a plurality of subscribers to which the publish-subscribe application publishes messages on the plurality of channels from the plurality of data producers; obtaining, with the publish-subscribe application, in the first security domain, a second public encryption key of the first subscriber, wherein: the second public encryption key is a member of a second public-private encryption key pair, each of the subscribers is associated with at least one public encryption key from among a plurality of public-private encryption key pairs, and respective subscribers have access to associated private encryption keys among the plurality of public-private encryption key pairs; generating a first re-encryption key associated with the first channel and the first subscriber, wherein: the first re-encryption key is generated with proxy re-encryption based on the first private encryption key and the second public encryption key, and the first re-encryption key is generated within the first security domain, such that the first private encryption key is not revealed outside of the first security domain by generating the first re-encryption key; in response to determining that the first subscriber is to be granted access to the first channel, providing the first re-encryption key to a portion of the publish-subscribe application outside of the first security domain; transforming at least part of the at least part of the first message that is encrypted with the first re-encryption key to at least partially form a first transformed message, wherein: transforming at least part of the at least part of the first message is performed without decrypting the at least part of the at least part of the first message, and transforming at least part of the at least part of the first message is performed outside of the first security domain; and providing the first transformed message on the first channel to the first subscriber, wherein: the at least part of the at least part of the first message is decryptable based on the second private encryption key of the first subscriber.

2. The one or more media of embodiment 1, wherein: re-encryption keys are generated for a plurality of pairs of subscribers and channels; at least some subscribers are associated with a plurality of re-encryption keys that afford access to a plurality of channels; and at least some channels are associated with a plurality of re-encryption keys that afford access to the respective channel by a plurality of subscribers.

3. The one or more media of any one of embodiments 1-2, wherein: the at least part of the first message is encrypted by the first data producer with a symmetric encryption key having more than 127 bits of entropy; the symmetric encryption key is encrypted with the first public encryption key of the first channel to which the first message is published to form an encrypted data encryption key; transforming the first message comprises transforming the encrypted data encryption key to form a transformed encrypted data encryption key; the encrypted data encryption key is not decryptable with the second private encryption key; and the at least part of the first message is accessible to the first subscriber by decrypting the transformed encrypted data encryption key with the second private encryption key to access the symmetric encryption key and then decrypting the at least part of the first message with the symmetric encryption key.

4. The one or more media of any one of embodiments 1-3, wherein: the second private encryption key is in a second security domain different from the first security domain; and the first re-encryption key is generated without accessing the second private encryption key in the first security domain.

5. The one or more media of embodiment 4, wherein: the plurality of public-private encryption key pairs have private encryption keys protected in a plurality of different security domains different from the first security domain, such that at least some private encryption keys are in different security domains.

6. The one or more media of any one of embodiments 1-5, wherein: the first message has a plurality of fields; the at least part of the first message is a first subset of the plurality of fields of the first message; and a second subset of the plurality of fields of the first message is not encrypted by the first publisher with the first public encryption key.

7. The one or more media of any one of embodiments 1-6, wherein: the first channel is associated with a plurality of field-specific public-private encryption key pairs; each of the field-specific public-private encryption key pairs is associated with a respective subset of the fields among the plurality of fields; the first publisher encrypts different fields, or data encryption keys thereof, with different corresponding public encryption keys among the plurality of field-specific public-private encryption key pairs; a plurality of field-specific re-encryption keys are generated for the first subscriber; and each of the field-specific re-encryption keys corresponds to a different one of the plurality of field-specific public-private encryption key pairs.

8. The one or more media of embodiment 7, wherein: the plurality of field-specific public-private encryption key pairs are deterministically generated based on a secret value in the first security domain having more than 127 bits of entropy and associated with the first channel.

9. The one or more media of embodiment 8, wherein: the plurality of field-specific public-private encryption key pairs are deterministically generated based on one or more parameters of fields to which respective field-specific public-private encryption key pairs pertain.

10. The one or more media of any one of embodiments 1-9, wherein: a second channel among the plurality of channels is associated with a message format having a plurality of fields; different subsets of the plurality of fields are associated with different public-private encryption key pairs having respective private encryption keys by which the associated respective subset of the plurality of fields is decryptable; a first set of a plurality of re-encryption keys is generated for the first subscriber to afford access to a first subset of the plurality of fields; a second set of a plurality of re-encryption keys is generated for a second subscriber to afford access to a second subset of the plurality of fields; and the first subset of the plurality of fields is different from the second subset of the plurality of fields.

11. The one or more media of any one of embodiments 1-10, wherein: the first security domain is on a different computing device from portions of the publish-subscribe application outside the first security domain.

12. The one or more media of any one of embodiments 1-11, the operations comprising: receiving, with the publish-subscribe application, from a second data producer, a second message and a second request to publish the second message to the first channel specified by the first request, wherein the second message is encrypted in the same manner as the first message.

13. The one or more media of embodiment 12, wherein: subscribers to the first channel or addresses of subscribers to the first channel are not identified in the first request or the second request; the first message includes message content and a ciphertext of an encrypted symmetric encryption key by which the message content is encrypted; and the first re-encryption key is used to at least partially transform a plurality of messages on the first channel.

14. The one or more media of any one of embodiments 1-11, wherein: a first message broker of the publish-subscribe application receives the first message and the first request; the first message broker determines that the first subscriber has been granted access to the first channel and, in response, selects the first re-encryption key from among a plurality of re-encryption keys of subscribers to the first channel and transforms the at least part of the first message based on the first re-encryption key; and the publish-subscribe application comprises a plurality of message brokers including the first message broker.

15. The one or more media of any one of embodiments 1-14, wherein the operations comprise: obtaining a plurality of rules by which access to messages in the first channel is determined based on content of the messages; and determining to transform the at least part of the first message based on a determination that content of the first message satisfies at least one of the plurality of rules.

16. The one or more media of any one of embodiments 1-15, wherein: the first message is received with encryption that is not decryptable by any subscribers to the first channel; and the first message is transformed into a plurality of different instances each with different encryption that is decryptable by different sets of subscribers.

17. The one or more media of any one of embodiments 1-16, wherein: the publish-subscribe application includes a distributed streaming platform having fault-tolerant distributed storage of published messages and executable on a plurality of computing devices; and the data publishers and subscribers are computing processes that interface with one another via the publish-subscribe application.

18. The one or more media of any one of embodiments 1-17, wherein: each message published via the publish-subscribe application is appended to an ordered, immutable list of messages stored by the publish-subscribe application; the list is stored on a plurality of partitions each managed by a different server among a plurality of servers; at last part of the list is replicated from a leader server among the plurality of servers to one or more follower servers among the plurality of servers; and at least some of the follower servers are in different data centers from one another.

19. A method comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. One or more tangible, non-transitory, machine readable media storing instructions that when executed by one or more processors effectuate operations comprising:
   receiving, with a publish-subscribe application executed by one or more processors, from a first data producer, a first message and a first request to publish the first message to a first channel specified by the first request, wherein:
      at least part of the first message is encrypted by the first data producer,
      the first data producer is one of a plurality of data producers for which the publish-subscribe application publishes messages,
      the first channel is one of a plurality of channels on which the publish-subscribe application publishes messages on behalf of the plurality of data producers,
      at least part of the at least part of the first message is decryptable with a first private encryption key of a first public-private encryption key pair associated with the first channel,
      each of the plurality of channels is associated with at least one different respective public-private encryption key pair among a plurality of public-private encryption key pairs,
      private encryption keys of the public-private encryption key pairs are maintained in a first security domain,
      the plurality of data producers are external to the first security domain, and
      public encryption keys of the public-private encryption key pairs are accessible to the plurality of data producers;
   determining, with the publish-subscribe application, that a first subscriber is to be granted access to at least part of messages published to the first channel, wherein:
      the first subscriber is one of a plurality of subscribers to which the publish-subscribe application publishes messages on the plurality of channels from the plurality of data producers;
   obtaining, with the publish-subscribe application, in the first security domain, a second public encryption key of the first subscriber, wherein:
      the second public encryption key is a member of a second public-private encryption key pair,
      each of the subscribers is associated with at least one public encryption key from among a plurality of public-private encryption key pairs, and
      respective subscribers have access to associated private encryption keys among the plurality of public-private encryption key pairs;
   generating a first re-encryption key associated with the first channel and the first subscriber, wherein:
      the first re-encryption key is generated with proxy re-encryption based on the first private encryption key and the second public encryption key, and
      the first re-encryption key is generated within the first security domain, such that the first private encryption key is not revealed outside of the first security domain by generating the first re-encryption key;
   in response to determining that the first subscriber is to be granted access to the first channel, providing the first re-encryption key to a portion of the publish-subscribe application outside of the first security domain;
   transforming at least part of the at least part of the first message that is encrypted with the first re-encryption key to at least partially form a first transformed message, wherein:
      transforming at least part of the at least part of the first message is performed without decrypting the at least part of the at least part of the first message, and
      transforming at least part of the at least part of the first message is performed outside of the first security domain; and
   providing the first transformed message on the first channel to the first subscriber, wherein:
      the at least part of the at least part of the first message is decryptable based on the second private encryption key of the first subscriber.

2. The one or more media of claim 1, wherein:
   re-encryption keys are generated for a plurality of pairs of subscribers and channels;
   at least some subscribers are associated with a plurality of re-encryption keys that afford access to a plurality of channels; and
   at least some channels are associated with a plurality of re-encryption keys that afford access to the respective channel by a plurality of subscribers.

3. The one or more media of claim 1, wherein:
   the at least part of the first message is encrypted by the first data producer with a symmetric encryption key having more than 127 bits of entropy;
   the symmetric encryption key is encrypted with the first public encryption key of the first channel to which the first message is published to form an encrypted data encryption key;
   transforming the first message comprises transforming the encrypted data encryption key to form a transformed encrypted data encryption key;
   the encrypted data encryption key is not decryptable with the second private encryption key; and
   the at least part of the first message is accessible to the first subscriber by decrypting the transformed encrypted data encryption key with the second private encryption key to access the symmetric encryption key and then decrypting the at least part of the first message with the symmetric encryption key.

4. The one or more media of claim 1, wherein:
   the second private encryption key is in a second security domain different from the first security domain; and
   the first re-encryption key is generated without accessing the second private encryption key in the first security domain.

5. The one or more media of claim 4, wherein:
   the plurality of public-private encryption key pairs have private encryption keys protected in a plurality of different security domains different from the first security domain, such that at least some private encryption keys are in different security domains.

6. The one or more media of claim 1, wherein:
   the first message has a plurality of fields;
   the at least part of the first message is a first subset of the plurality of fields of the first message; and
   a second subset of the plurality of fields of the first message is not encrypted by the first publisher with the first public encryption key.

7. The one or more media of claim 1, wherein:
the first channel is associated with a plurality of field-specific public-private encryption key pairs;
each of the field-specific public-private encryption key pairs is associated with a respective subset of the fields among the plurality of fields;
the first publisher encrypts different fields, or data encryption keys thereof, with different corresponding public encryption keys among the plurality of field-specific public-private encryption key pairs;
a plurality of field-specific re-encryption keys are generated for the first subscriber; and
each of the field-specific re-encryption keys corresponds to a different one of the plurality of field-specific public-private encryption key pairs.

8. The one or more media of claim 7, wherein:
the plurality of field-specific public-private encryption key pairs are deterministically generated based on a secret value in the first security domain having more than 127 bits of entropy and associated with the first channel.

9. The one or more media of claim 8, wherein:
the plurality of field-specific public-private encryption key pairs are deterministically generated based on one or more parameters of fields to which respective field-specific public-private encryption key pairs pertain.

10. The one or more media of claim 1, wherein:
a second channel among the plurality of channels is associated with a message format having a plurality of fields;
different subsets of the plurality of fields are associated with different public-private encryption key pairs having respective private encryption keys by which the associated respective subset of the plurality of fields is decryptable;
a first set of a plurality of re-encryption keys is generated for the first subscriber to afford access to a first subset of the plurality of fields;
a second set of a plurality of re-encryption keys is generated for a second subscriber to afford access to a second subset of the plurality of fields; and
the first subset of the plurality of fields is different from the second subset of the plurality of fields.

11. The one or more media of claim 1, wherein:
the first security domain is on a different computing device from portions of the publish-subscribe application outside the first security domain.

12. The one or more media of claim 1, the operations comprising:
receiving, with the publish-subscribe application, from a second data producer, a second message and a second request to publish the second message to the first channel specified by the first request, wherein the second message is encrypted in the same manner as the first message.

13. The one or more media of claim 12, wherein:
subscribers to the first channel or addresses of subscribers to the first channel are not identified in the first request or the second request;
the first message includes message content and a ciphertext of an encrypted symmetric encryption key by which the message content is encrypted; and
the first re-encryption key is used to at least partially transform a plurality of messages on the first channel.

14. The one or more media of claim 1, wherein:
a first message broker of the publish-subscribe application receives the first message and the first request;
the first message broker determines that the first subscriber has been granted access to the first channel and, in response, selects the first re-encryption key from among a plurality of re-encryption keys of subscribers to the first channel and transforms the at least part of the first message based on the first re-encryption key; and
the publish-subscribe application comprises a plurality of message brokers including the first message broker.

15. The one or more media of claim 1, wherein the operations comprise:
obtaining a plurality of rules by which access to messages in the first channel is determined based on content of the messages; and
determining to transform the at least part of the first message based on a determination that content of the first message satisfies at least one of the plurality of rules.

16. The one or more media of claim 1, wherein:
the first message is received with encryption that is not decryptable by any subscribers to the first channel; and
the first message is transformed into a plurality of different instances each with different encryption that is decryptable by different sets of subscribers.

17. The one or more media of claim 1, wherein:
the publish-subscribe application includes a distributed streaming platform having fault-tolerant distributed storage of published messages and executable on a plurality of computing devices; and
the data publishers and subscribers are computing processes that interface with one another via the publish-subscribe application.

18. The one or more media of claim 1, wherein:
each message published via the publish-subscribe application is appended to an ordered, immutable list of messages stored by the publish-subscribe application;
the list is stored on a plurality of partitions each managed by a different server among a plurality of servers;
at last part of the list is replicated from a leader server among the plurality of servers to one or more follower servers among the plurality of servers; and
at least some of the follower servers are in different data centers from one another.

19. The one or more media of claim 1, the operations comprising:
steps for delegating access to encrypted portions of messages in publish-subscribe architectures; and
steps for providing a publish-subscribe service.

20. A method, comprising:
receiving, with a publish-subscribe application executed by one or more processors, from a first data producer, a first message and a first request to publish the first message to a first channel specified by the first request, wherein:
at least part of the first message is encrypted by the first data producer,
the first data producer is one of a plurality of data producers for which the publish-subscribe application publishes messages,
the first channel is one of a plurality of channels on which the publish-subscribe application publishes messages on behalf of the plurality of data producers,
at least part of the at least part of the first message is decryptable with a first private encryption key of a first public-private encryption key pair associated with the first channel, each of the plurality of channels is associated with at least one different respective public-private encryption key pair among a plurality of public-private encryption key pairs,
private encryption keys of the public-private encryption key pairs are maintained in a first security domain,
the plurality of data producers are external to the first security domain, and
public encryption keys of the public-private encryption key pairs are accessible to the plurality of data producers;

determining, with the publish-subscribe application, that a first subscriber is to be granted access to at least part of messages published to the first channel, wherein:
the first subscriber is one of a plurality of subscribers to which the publish-subscribe application publishes messages on the plurality of channels from the plurality of data producers;

obtaining, with the publish-subscribe application, in the first security domain, a second public encryption key of the first subscriber, wherein:
the second public encryption key is a member of a second public-private encryption key pair,
each of the subscribers is associated with at least one public encryption key from among a plurality of public-private encryption key pairs, and
respective subscribers have access to associated private encryption keys among the plurality of public-private encryption key pairs;

generating a first re-encryption key associated with the first channel and the first subscriber, wherein:
the first re-encryption key is generated with proxy re-encryption based on the first private encryption key and the second public encryption key, and
the first re-encryption key is generated within the first security domain, such that the first private encryption key is not revealed outside of the first security domain by generating the first re-encryption key;

in response to determining that the first subscriber is to be granted access to the first channel, providing the first re-encryption key to a portion of the publish-subscribe application outside of the first security domain;

transforming at least part of the at least part of the first message that is encrypted with the first re-encryption key to at least partially form a first transformed message, wherein:
transforming at least part of the at least part of the first message is performed without decrypting the at least part of the at least part of the first message, and
transforming at least part of the at least part of the first message is performed outside of the first security domain; and providing the first transformed message on the first channel to the first subscriber, wherein:
the at least part of the at least part of the first message is decryptable based on the second private encryption key of the first subscriber.

* * * * *